(12) United States Patent
Pederson

(10) Patent No.: US 10,029,523 B2
(45) Date of Patent: Jul. 24, 2018

(54) CLEVIS AND DRAWBAR SYSTEM

(71) Applicant: Mel Pederson, Prelate (CA)

(72) Inventor: Mel Pederson, Prelate (CA)

( * ) Notice: Subject to any disclaimer, the term of this patent is extended or adjusted under 35 U.S.C. 154(b) by 2 days.

(21) Appl. No.: 15/340,650

(22) Filed: Nov. 1, 2016

(65) Prior Publication Data

US 2018/0117978 A1     May 3, 2018

(51) Int. Cl.
*B60D 1/02*     (2006.01)
*B60D 1/145*    (2006.01)

(52) U.S. Cl.
CPC ............ *B60D 1/025* (2013.01); *B60D 1/145* (2013.01)

(58) Field of Classification Search
CPC ..................................................... B60D 1/025
See application file for complete search history.

(56) References Cited

U.S. PATENT DOCUMENTS

| | | | | |
|---|---|---|---|---|
| 2,845,281 A * | 7/1958 | Green | ................. | B60D 1/02 280/479.3 |
| 3,190,677 A * | 6/1965 | Robbins | ................. | B60D 1/02 280/515 |
| 3,346,273 A * | 10/1967 | Folkerts | ................. | B60D 1/02 280/457 |
| 3,843,160 A * | 10/1974 | Frushour | ................. | B60D 1/02 280/416.1 |
| 4,008,905 A * | 2/1977 | Soteropulos | ......... | A01B 59/042 180/14.1 |
| 4,195,704 A * | 4/1980 | Bass | ................. | A01B 59/042 180/14.1 |
| 4,394,031 A * | 7/1983 | Barton | ................. | B60D 1/02 172/677 |
| 4,671,528 A | 6/1987 | Thompson | | |
| 4,783,094 A | 11/1988 | Sands | | |
| D317,426 S | 6/1991 | Lytle | | |
| 5,193,625 A * | 3/1993 | Goll | ................. | B60D 1/02 172/248 |
| 5,427,399 A * | 6/1995 | Olson | ................. | A01B 59/042 280/508 |
| 5,921,699 A * | 7/1999 | Olson | ................. | B60D 1/02 280/509 |
| 6,679,512 B1 * | 1/2004 | Plessala | ................. | B60D 1/02 280/460.1 |
| 6,758,486 B1 * | 7/2004 | Kollath | ................. | B60D 1/02 280/504 |
| 6,802,523 B1 * | 10/2004 | Profitt | ................. | B60D 1/025 280/432 |
| 7,036,841 B2 * | 5/2006 | Champagne | ............. | B60D 1/28 280/506 |
| 7,264,261 B2 * | 9/2007 | Konsela | ................. | B60D 1/02 280/416.1 |
| 7,478,823 B2 | 1/2009 | Doubet | | |

(Continued)

FOREIGN PATENT DOCUMENTS

WO     WO2005070709     8/2005

*Primary Examiner* — Kevin Hurley

(57) ABSTRACT

A clevis and drawbar system for coupling an implement to a tractor includes a tractor that has a drawbar. A clevis is selectively positioned on the drawbar. The clevis engages a tow bar on an implement thereby facilitating the tractor to tow the implement. A pin is selectively extended through the clevis and the drawbar. The pin engages the implement thereby facilitating the implement to be coupled to the tractor.

10 Claims, 4 Drawing Sheets

(56) References Cited

U.S. PATENT DOCUMENTS

| | | | |
|---|---|---|---|
| 7,516,975 B2 * | 4/2009 | Lair | B60D 1/02 |
| | | | 280/506 |
| 8,540,270 B2 | 9/2013 | Terpsma | |
| 8,616,576 B2 * | 12/2013 | Olson | B60D 1/02 |
| | | | 280/416.2 |
| 8,632,091 B2 | 1/2014 | Shaw | |
| 2017/0086346 A1 * | 3/2017 | Payne | A01B 59/004 |

* cited by examiner

CLEVIS AND DRAWBAR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to clevis devices and more particularly pertains to a new clevis device for coupling an implement to a tractor.

BRIEF SUMMARY OF THE INVENTION

An embodiment of the disclosure meets the needs presented above by generally comprising a tractor that has a drawbar. A clevis is selectively positioned on the drawbar. The clevis engages a tow bar on an implement thereby facilitating the tractor to tow the implement. A pin is selectively extended through the clevis and the drawbar. The pin engages the implement thereby facilitating the implement to be coupled to the tractor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
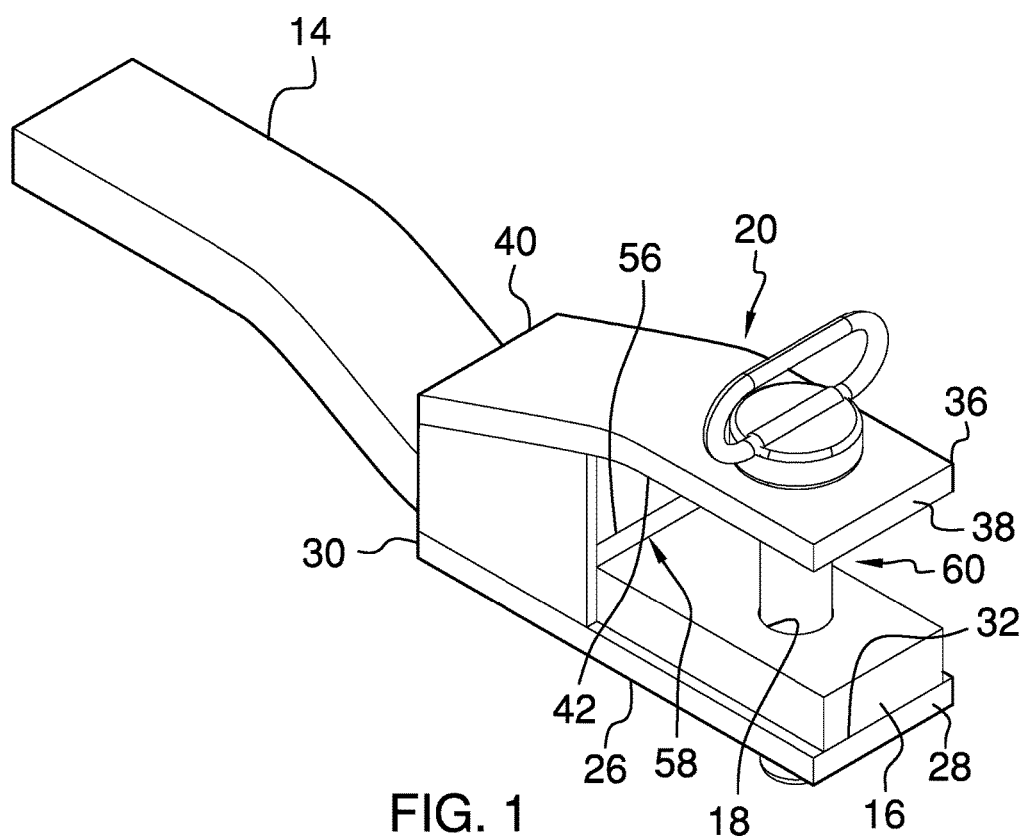
FIG. 1 is a front perspective view of a clevis and drawbar system according to an embodiment of the disclosure.
Figure 2:
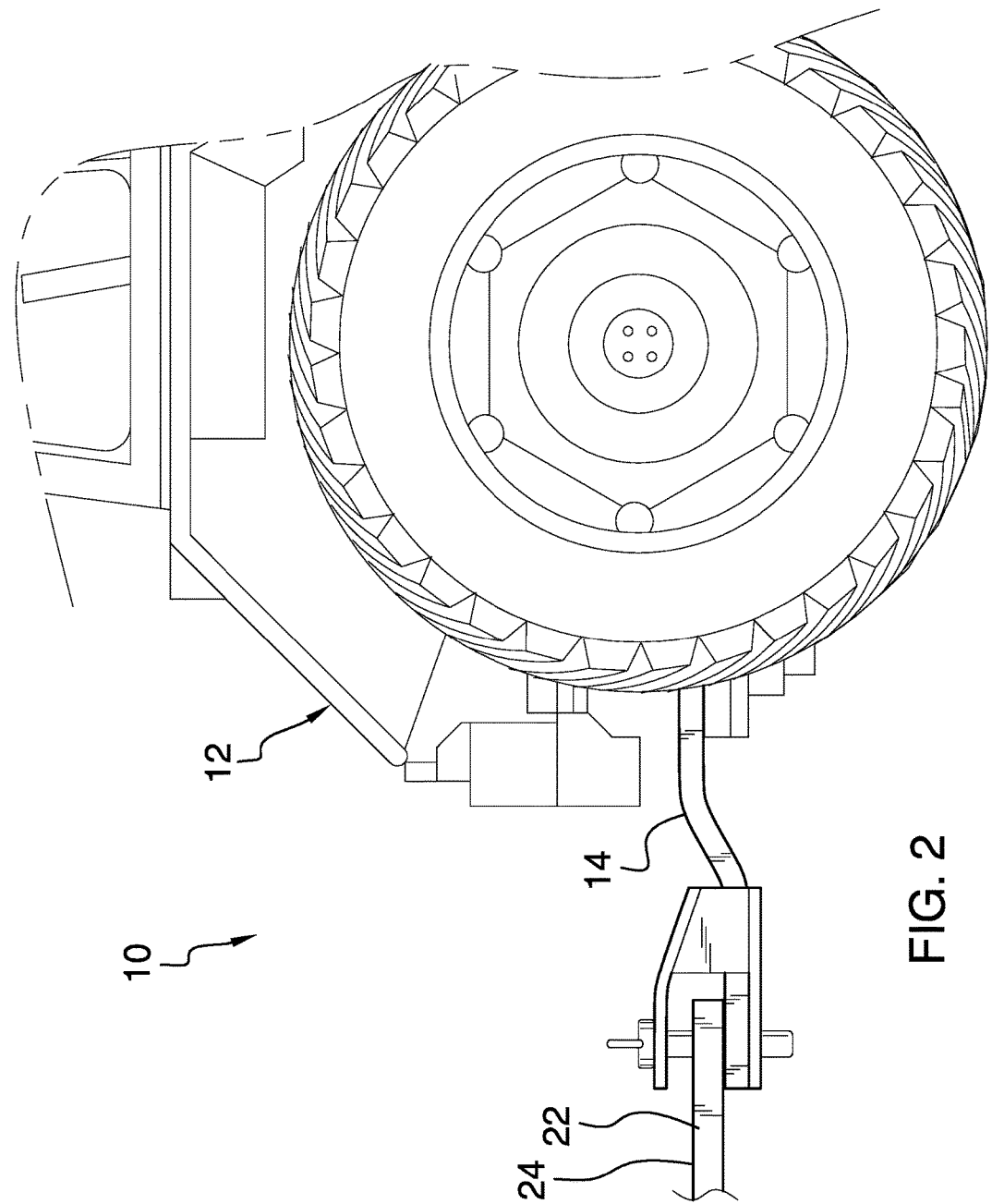
FIG. 2 is a perspective in-use view of an embodiment of the disclosure.
Figure 3:
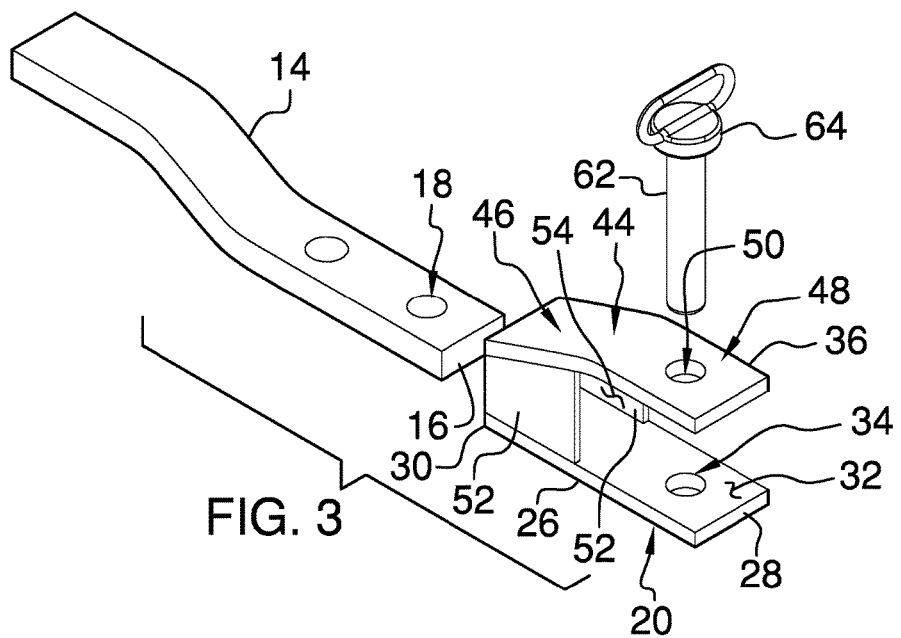
FIG. 3 is an exploded perspective view of an embodiment of the disclosure.
Figure 4:
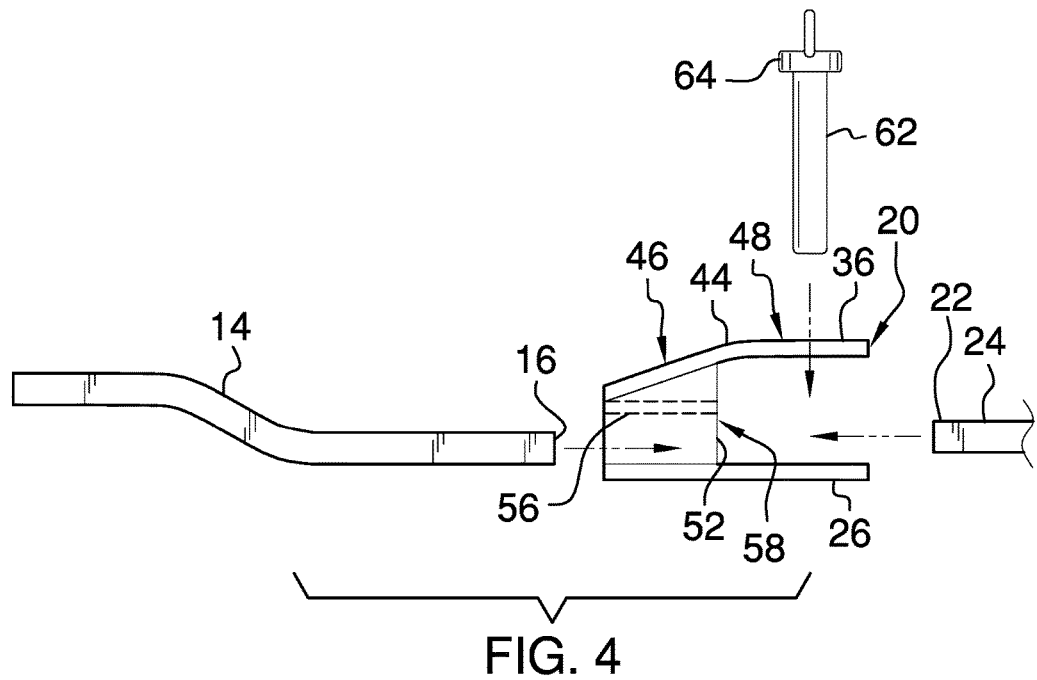
FIG. 4 is an exploded right side view of an embodiment of the disclosure.
Figure 5:
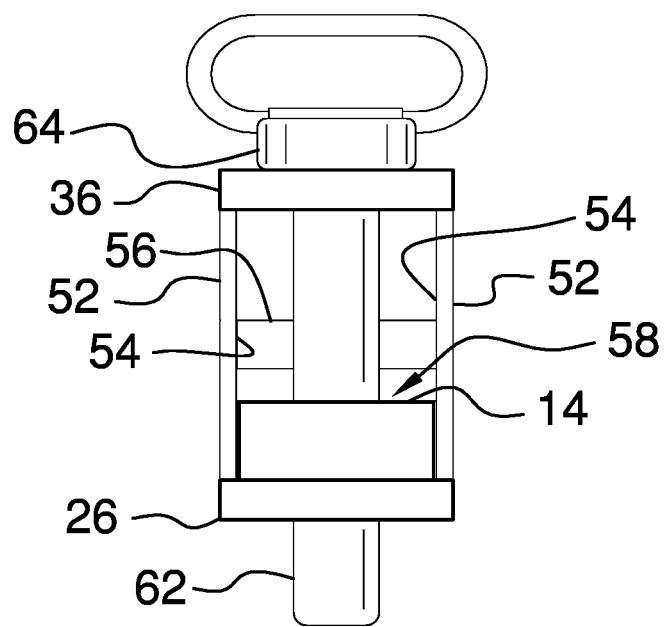
FIG. 5 is a front view of an embodiment of the disclosure.

With reference now to the drawings, and in particular to FIGS. 1 through 5 thereof, a new clevis device embodying the principles and concepts of an embodiment of the disclosure and generally designated by the reference numeral 10 will be described.

As best illustrated in FIGS. 1 through 5, the clevis and drawbar system 10 generally comprises a tractor 12 that has a drawbar 14. The drawbar 14 has a distal end 16 with respect to the tractor 12. Moreover, the drawbar 14 has at least one aperture 18 therein. The tractor 12 may be a farm tractor or the like. The drawbar 14 may have a length ranging between twenty five cm and thirty cm.

A clevis 20 is provided and the clevis 20 is selectively positioned on the distal end 16 of the drawbar 14. Moreover, the clevis 20 selectively engages a tow bar 22 on an implement 24. Thus, the tractor 12 may tow the implement 24. The implement 24 may be a plow or other implement 24 commonly used for farming purposes.

The clevis 20 comprises a first bar 26. The first bar 26 has a first end 28, a second end 30 and a top surface 32 extending therebetween. The first bar 26 has a first aperture 34 extending therethrough. The first aperture 34 is positioned closer to the first end 28 than the second end 30.

A second bar 36 is provided that has a primary end 38, a secondary end 40 and a bottom surface 42 extending therebetween. The second bar 36 has a bend 44 thereon. The bend 44 defines a first portion 46 of the second bar 36 forming an angle with a second portion 48 of the second bar 36. The second bar 36 has a second aperture 50 extending therethrough. Moreover, the second aperture 50 is positioned closer to the primary end 38 than the secondary end 40.

A pair of spacers 52 is provided. Each of the spacers 52 extends between the top surface 32 of the first bar 26 and the bottom surface 42 of the second bar 36. The first bar 26 is spaced from the second bar 36 and the first aperture 34 is aligned with the second aperture 50. Moreover, the second portion 48 of the second bar 36 is oriented parallel with the first bar 26. Each of the spacers 52 has an inwardly facing surface 54 and the spacers 52 are spaced apart from each other. Each of the spacers 52 extends forwardly from the second end 30 of the first bar 26 and the secondary end 40 of the second bar 36.

A medial wall 56 extends between the inwardly facing surface 54 of each of the spacers 52. The medial wall 56 is spaced from the top surface 32 of the first bar 26 to define a drawbar space 58 between the medial wall 56 and the first bar 26. The drawbar 14 extends through the drawbar space 58 when the clevis 20 is positioned on the clevis 20. Moreover, the at least one aperture 18 is aligned with each of the first aperture 34 and the second aperture 50. The drawbar 14 defines a tow bar space 60 between the drawbar 14 and the bottom surface 42 of the second bar 36 when the drawbar 14 is positioned in the clevis 20. Thus, the tow bar space 60 insertably receives a tow bar 22 on the implement 24.

A pin 62 is provided. The pin 62 is selectively extended through the clevis 20 and the drawbar 14. Moreover, the pin 62 engages the implement 24. Thus, the implement 24 is coupled to the tractor 12.

The pin 62 extends through each of the first aperture 34, the at least one aperture 18 in the drawbar 14, the tow bar 22 on the implement 24 and the second aperture 50. The pin 62 includes a head 64. The head 64 abuts the second bar 36 when the pin 62 is extended through the second aperture 50. Thus, the head 64 inhibits the pin 62 from falling through the second aperture 50.

In use, the clevis 20 is manipulated to extend the drawbar 14 through the drawbar space 58 in the clevis 20. The tractor 12 is backed toward the implement 24 such that the tow bar 22 is positioned in the tow bar space 60. The pin 62 is extended through the clevis 20, the tow bar 22 and the drawbar 14. Thus, the implement 24 is coupled to the tractor 12 without the use of a threaded fastener and a wrench.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A clevis and drawbar system comprising:
a tractor having a drawbar, said drawbar having at least one aperture therein;
a clevis being selectively positioned on said drawbar wherein said clevis is configured to engage a tow bar on an implement thereby facilitating said tractor to tow the implement, said clevis including a first bar having a first end, a second end and a top surface extending therebetween;
a pin being selectively extended through said clevis and said drawbar wherein said pin is configured to engage the implement thereby facilitating the implement to be coupled to said tractor; and
a second bar having a primary end, a secondary end and a bottom surface extending therebetween, said second bar having a bend thereon to define a first portion of said second bar forming an angle with a second portion of said second bar.

2. The system according to claim 1, wherein said first bar has a first aperture extending therethrough, said first aperture being positioned closer to said first end than said second end.

3. The system according to claim 1, wherein said second bar has a second aperture extending therethrough, said second aperture being positioned closer to said primary end than said secondary end.

4. The system according to claim 3, wherein:
said clevis includes a first bar having a first aperture; and
said pin extends through each of said first aperture, said at least one aperture in said drawbar, the tow bar on the implement and said second aperture.

5. The system according to claim 4, wherein said pin includes a head, said head abutting said second bar when said pin is extended through said second aperture such that said head inhibits said pin from falling through said second aperture.

6. A clevis and drawbar system comprising:
a tractor having a drawbar, said drawbar having at least one aperture therein;
a clevis being selectively positioned on said drawbar wherein said clevis is configured to engage a tow bar on an implement thereby facilitating said tractor to tow the implement, said clevis including a first bar having a first end, a second end and a top surface extending therebetween, said first bar having a first aperture extending therethrough, said first aperture being positioned closer to said first end than said second end;
a pin being selectively extended through said clevis and said drawbar wherein said pin is configured to engage the implement thereby facilitating the implement to be coupled to said tractor;
a second bar having a bottom surface, a secondary end, a second portion and a second aperture; and
a pair of spacers, each of said spacers extending between said top surface of said first bar and said bottom surface of said second bar such that said first bar is spaced from said second bar having said first aperture being aligned with said second aperture, said second portion of said second bar being oriented parallel with said first bar.

7. The system according to claim 6, wherein each of said spacers has an inwardly facing surface, said spacers being spaced apart from each other, each of said spacers extending forwardly from said second end of said first bar and said secondary end of said second bar.

8. The system according to claim 7, further comprising a medial wall extending between said inwardly facing surface of each of said spacers, said medial wall being spaced from said top surface of said first bar to define a drawbar space between said medial wall and said first bar, said drawbar extending through said drawbar space when said clevis is positioned on said clevis having said at least one aperture being aligned with each of said first aperture and said second aperture.

9. The system according to claim 8, wherein said drawbar defines a tow bar space between said drawbar and said bottom surface of said second bar when said drawbar is positioned in said clevis wherein said tow bar space is configured to insertably receive a tow bar on the implement.

10. A clevis and drawbar system comprising:
a tractor having a drawbar, said drawbar having at least one aperture therein;
a clevis being selectively positioned on said drawbar wherein said clevis is configured to engage a tow bar on an implement thereby facilitating said tractor to tow the implement, said clevis comprising:

a first bar having a first end, a second end and a top surface extending therebetween, said first bar having a first aperture extending therethrough, said first aperture being positioned closer to said first end than said second end, a second bar having a primary end, a secondary end and a bottom surface extending therebetween, said second bar having a bend thereon to define a first portion of said second bar forming an angle with a second portion of said second bar, said second bar having a second aperture extending therethrough, said second aperture being positioned closer to said primary end than said secondary end, a pair of spacers, each of said spacers extending between said top surface of said first bar and said bottom surface of said second bar such that said first bar is spaced from said second bar having said first aperture being aligned with said second aperture, said second portion of said second bar being oriented parallel with said first bar, each of said spacers having an inwardly facing surface, said spacers being spaced apart from each other, each of said spacers extending forwardly from said second end of said first bar and said secondary end of said second bar, and a medial wall extending between said inwardly facing surface of each of said spacers, said medial wall being spaced from said top surface of said first bar to define a drawbar space between said medial wall and said first bar, said drawbar extending through said drawbar space when said clevis is positioned on said clevis having said at least one aperture being aligned with each of said first aperture and said second aperture, said drawbar defining a tow bar space between said drawbar and said bottom surface of said second bar when said drawbar is positioned in said clevis wherein said tow bar space is configured to insertably receive a tow bar on the implement; and a pin being selectively extended through said clevis and said drawbar wherein said pin is configured to engage the implement thereby facilitating the implement to be coupled to said tractor, said pin extending through each of said first aperture, said at least one aperture in said drawbar, the tow bar on the implement and said second aperture, said pin including a head, said head abutting said second bar when said pin is extended through said second aperture such that said head inhibits said pin from falling through said second aperture.

* * * * *